J. NORTHCUTT AND M. CRAWFORD.
AGRICULTURAL MACHINE.
APPLICATION FILED JAN. 12, 1917. RENEWED OCT. 3, 1919.

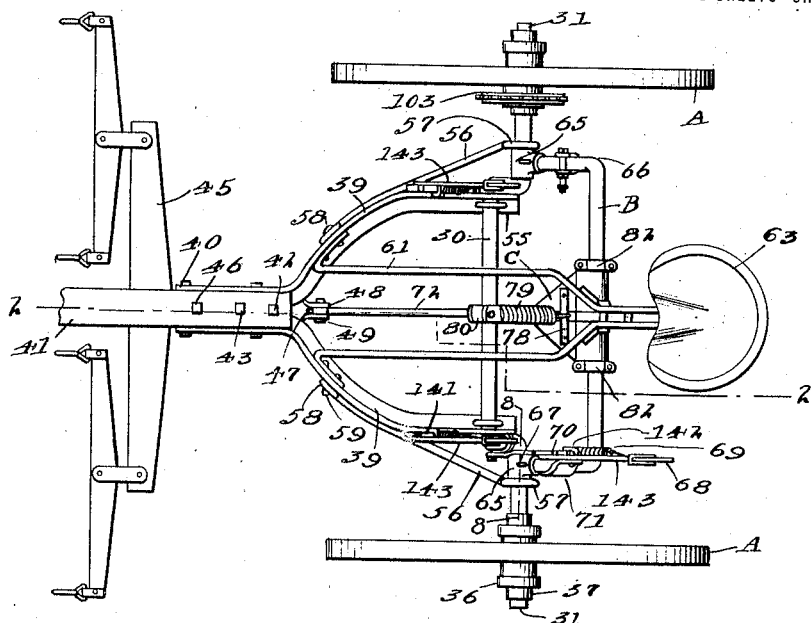

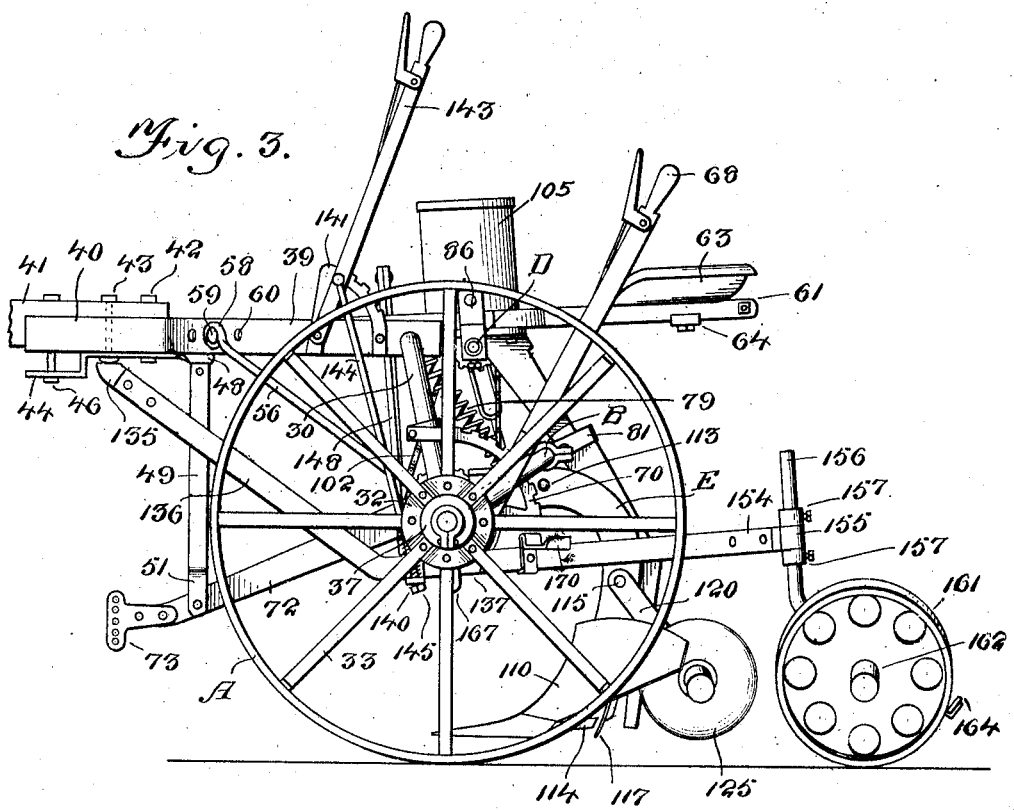

1,326,773.

Patented Dec. 30, 1919.

Witnesses
K. A. Thomas

Inventors
J. Northcutt
AND
Miner Crawford
By Victor J. Evans
Attorney

UNITED STATES PATENT OFFICE.

JOHN NORTHCUTT AND MINER CRAWFORD, OF SILVERTON, TEXAS.

AGRICULTURAL MACHINE.

1,326,773.  Specification of Letters Patent.  Patented Dec. 30, 1919.

Application filed January 12, 1917, Serial No. 142,025. Renewed October 3, 1919. Serial No. 328,327.

*To all whom it may concern:*

Be it known that we, JOHN NORTHCUTT and MINER CRAWFORD, citizens of the United States, residing at Silverton, in the county of Briscoe and State of Texas, have invented new and useful Improvements in Agricultural Machines, of which the following is a specification.

This invention relates to agricultural machines for tilling the soil, for planting and covering seed, cultivating crops and other like purposes.

The prime object of the invention is to produce a simple and improved wheeled frame structure which may be utilized as a basis to support machines or devices of various kinds, thereby enabling various devices, such as plows, listers or cultivators of various kinds to be utilized in connection with a single carrying frame.

A further object of the invention is to so construct the said carrying frame as to enable proper adjustment and manipulation of the machines or devices used in connection therewith to be effected without changing the structure of the frame.

A further object of the invention is to simplify and improve the detailed construction of the carrying frame and the parts thereof.

A further object of the invention is to so construct the various parts or attachments intended to be used in connection with the carrying frame to particularly adapt the same for such use.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:—

Figure 1 is a top plan view of the carrying frame including the sub-arch and the implement beam.

Fig. 2 is a longitudinal vertical sectional view of the same taken on the line 2—2 in Fig. 1.

Fig. 3 is a side elevation including also the plow, a planter, the cultivator beams and the coverers.

Fig. 5 is a sectional detail view taken through the axle and the sub-arch on the line 8—8 in Fig. 1.

Corresponding parts in the several figures are denoted by like characters of reference.

Figure 4:
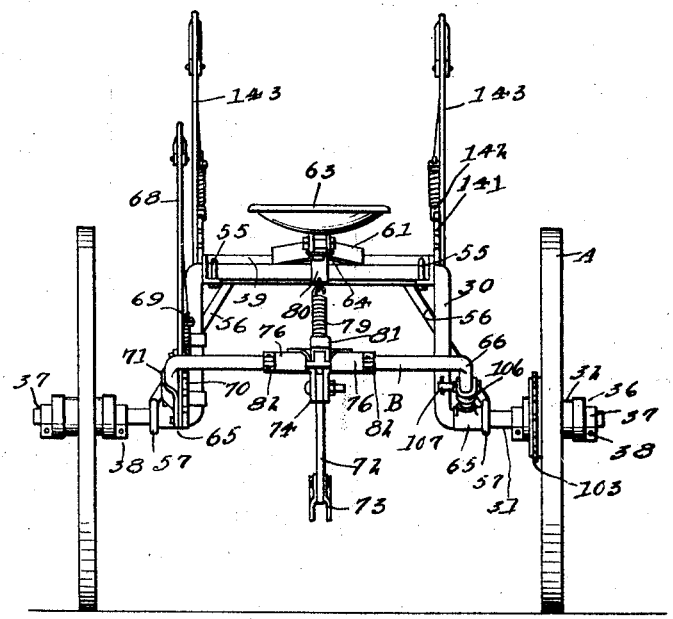
Fig. 4 is a rear view of the frame as seen in Figs. 1 and 2.
Figure 6:
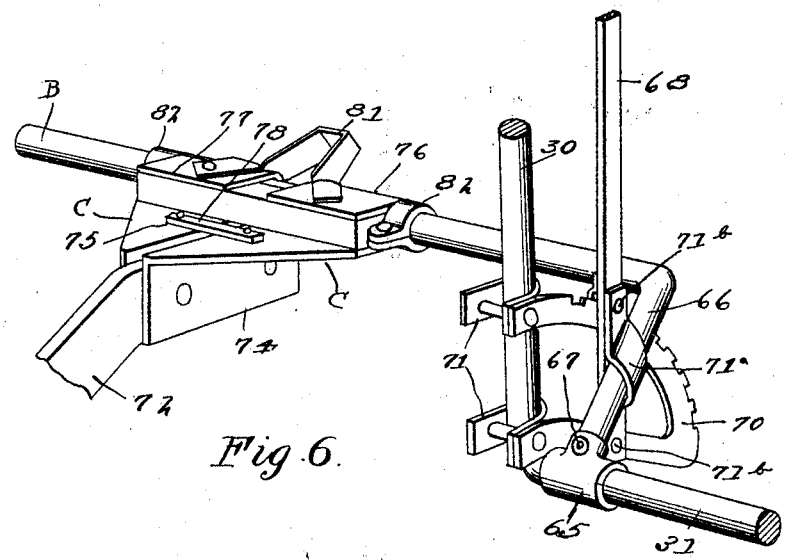
Fig. 6 is a perspective detail view of the sub-arch and related parts.

Referring to the drawings, 30 designates the axle arch having spindles 31 on which the wheels A are supported for rotation; said spindles being of such length as to give an ample range of adjustment of the wheels longitudinally thereof to enable said wheels to be spaced various distances apart. The wheels include hubs 32 which are recessed for the reception of the spokes 33, the latter being made of flat iron or steel. For the purpose of securing the wheels in adjusted position on the spindles sand bands 36 are provided, said sand bands having collars 37 engaging the ends of the hub, and said sand bands being split and provided with clamp bolts 38 by the tightening of which the sand bands will be clamped securely on the spindles adjacent to the ends of the wheel hubs. The top frame is composed of side bars 39, said side bars being formed of angle bars by properly bending the same to form forwardly projecting brackets 40 that serve to support the tongue 41, said tongue being supported between the vertical flanges of the angle bars and resting upon the horizontal flanges of the same, said horizontal flanges being slightly spaced apart for the reception of the bolts 42, 43 which serve for the attachment of the doubletree strap 44, the latter being downwardly offset at its front end for the reception of a doubletree 45 which latter is pivotally secured by means of a bolt 46. The rearward end of the doubletree strap is split longitudinally for a portion of its length, as seen at 47, and the portions separated by the slit or slot are twisted to form lugs or ears 48, the same being vertically disposed for the passage therebetween of a connecting bar or strap 49, said strap being provided with numerous apertures 50 for the passage of a pin or bolt 51, whereby it is adjustably mounted. The lower end of the strap 49 is bifurcated, as seen at 52. The bolt 43 is equipped with a nut 53 and with washers 54 having opposed convex faces.

The vertical flanges of the frame bars 39 are apertured near their rearward ends for the passage of the axle arch, which latter is additionally secured by means of U-shaped clips 55 engaging the horizontal flanges of the frame bars and serving to assemble the parts securely. Side braces 56 are provided, the same having eyes 57 at their lower ends engaging the spindles 31, said side braces being provided at their upper ends with eyes 58 for the passage of bolts 59 adjustably engaging the frame bars, the latter being provided with several perforations 60 for engagement with the bolts 59. It will be seen that by varying the point of attachment of the side braces with respect to the frame bars, the angle of the axle arch with respect to the top frame may be varied, thus permitting the top frame to be placed in the most convenient position with respect to the ground.

The seat supporting bars 61 are attached to the vertical flanges of the frame bars near the forwardly extending brackets 40, said seat bars being extended rearwardly in spaced relation, and said bars being bent intermediate their ends to produce a seat supporting bracket on which the seat 63 is adjustably mounted by a clamp device 64. The seat may be readily adjusted longitudinally to the proper point where the weight of the operator will be advantageously balanced with respect to the frame and the mechanism carried thereby.

The spindles 31 are provided with T-couplings for the reception of the limbs 66 of the sub-arch B. Cotter keys 67 serve to connect the limbs of the sub-arch with the couplings 65 securely and yet in such a manner as to enable the sub-arch to be detached when desired. The couplings 65 are free to rotate on the spindles, and hence serve to pivotally connect the limbs of the sub-arch to the spindles, thereby providing for the adjustment of the sub-arch about the axes of the spindles. Clamped securely on one limb of the sub-arch is an adjusting lever 68 having a stop member 69 engaging a segment rack 70 which is clamped securely on one limb of the axle arch 30 by means of clips 71. A clip strap 71ª is used for the clamping lever and is on the opposite side of the limb of the sub-arch from the lever and is riveted at its upper and lower ends to the lever as shown at 71ᵇ. By means of this lever which turns with the sub-arch the sub-arch may be moved pivotally with respect to the axle arch and retained securely in any position to which it may be adjusted.

To provide for the attachment of various machine elements to the frame, there is provided an implement beam 72 having at its front end a clevis 73 with which the doubletree 45 may be connected when desired, as shown in some of the figures of the drawings. Mounted securely on the side faces of the beam 72 at the rear end thereof are angle plates C having vertical flanges 74 which are secured on the side faces of the beam and lateral flanges 75, said lateral flanges being bent to produce U-shaped keepers 76 engaging the sub-arch B, said keepers serving also to support a bearing block 77 which, together with said keepers, forms a bearing in which the sub-arch may rotate. Secured on the lateral flanges of the angle plates C is a cross bar 78 with which is connected one end of a coiled spring 79, the other end of which is connected with a clip 80 mounted on the axle arch, said spring serving to counterbalance the sub-arch and the parts connected therewith to facilitate the operation of lifting the same when needed. A rearwardly extending keeper or clip 81 is also mounted on the angle plates C for a purpose to be hereinafter set forth. Clamps or collars 82 are mounted on the sub-arch, one at each side of the angle plates connected with the implement beam to provide for adjustment of the latter longitudinally of the sub-arch and to retain the same in adjusted position. The forward end of the implement beam 72 is pivoted in the fork 52 of the connecting bar 49 whereby the front end of the beam may be secured at various elevations.

A planter attachment 105 may be used on the machine and has a shaft D which has a sprocket wheel and is driven by a sprocket chain 102 which engages on a sprocket wheel 103 which revolves with one of the wheels A.

One of the implements that is adapted to be supported on the beam 72 is a double plow or middle buster 110, the same being mounted on a standard E. The plow is here shown as equipped with horizontal knives or cutters 114. The frame 120 is pivotally connected to the standard E as at 115 and is provided with covering disks 125.

A head plate 134 is fitted on the bolt 43 and has rearwardly extending arms 135 with which a pair of rearwardly diverging beams or bars 136 are securely connected, said beams terminating at their rear ends in arms or brackets 137 to which various implements may be attached. A rack segment 141 is secured on each side bar of the main frame and is engaged by a stop member 142 carried by a hand lever 143. Each hand lever is connected by a rod 144 to one of the arms or beams 136. The cultivator beams are connected together by means of an A-shaped hobble 148.

The packer attachment comprises a V-shaped yoke 154 provided at its rearward end with a vertically disposed bearing sleeve 155 for the passage of a shank 156, said shank being equipped with set collars 157 to provide for the vertical adjustment without interfering with the rotation thereof. The lower end of the shank 156 is bent rearwardly to support a bearing in which a suitable shaft is mounted, said shaft carrying the packer disks 161 which are provided with bearings 162.

The yoke 154 and the other parts of the packing device are so proportioned that when said packing device is used the packer wheels will travel in the furrow made by the plow or lister and to the rearward of the furrow opener and also to the rearward of the covering disks, its function being to pack and compact the soil thrown over the sides of the furrow by the action of the covering disks. It may be noted that the yoke 154 is provided with foot rests 170.

From the foregoing description taken in connection with the drawings hereto annexed it will be seen that we have produced a very simple and effective wheeled frame which may be utilized in connection with a variety of implements for the purpose of supporting the same for operation. The use of the wheeled frame is by no means necessarily limited to the implements herein specifically described, inasmuch as other implements might be contrived to be used in connection with the frame, and the construction of the implements herein described might be altered and modified. It is, however, essential that implements to be used in connection with the frame be provided with means for attachment to the implement beam 72. It will be observed that means are provided for raising and lowering the point of attachment of the implement beam with respect to the frame, and that the rearward end of said implement beam, together with any implement carried thereby, may be raised or lowered by proper manipulation of the sub-arch. The latter also serves, through suitable means to throw the planter mechanism in and out of mesh. Thus, when the planter is mounted on the frame and the middle buster with its attachments is mounted on the implement beam, the machine may be utilized for forming a listing furrow in the ground, furrowing the bottom of the same for the reception of seed, depositing seed, and covering the same. In connection with these devices the packer wheels attached to the cultivator beams are also usually employed. The machine may thus be successfully used for planting and covering corn or other seeds. The several machines or implements adapted to be used in connection with the carrying frame may be very readily detached or assembled therewith as may be required, and the entire construction and organization is extremely simple, convenient and efficient for the purposes for which it is provided.

Having thus described the invention, what is claimed as new, is:—

1. In a machine of the class described, a connection between an implement beam and an arched axle, said connection comprising a pair of angle plates for attachment to opposite sides of the beam and having laterally extending flanges provided with forwardly bent U-shaped portions to engage around the rear side of the axle arch, and a bearing block secured on said flanges and in the said U-shaped portions to bear against the front side of the axle arch.

2. In a machine of the class described, a wheeled carrying frame having an arched axle and a sub-arch supported for swinging movement on the spindles of the axle, a tongue connected with the frame, a clevis plate secured on the tongue and having rearwardly extending transversely apertured lugs, an implement beam pivotally connected at its rearward end with the sub-arch, and a brace rod for adjustably connecting the forward end of the implement beam with the lugs of the clevis.

3. In a machine of the class described, a wheeled carrying frame including an arch axle having wheel carrying spindles and a sub-arch connected with the spindles of the axle for swinging movement about the axis of the spindles, a tongue extending forwardly from and connected with the carrying frame, a clevis plate connected with the tongue, an implement beam having a bearing at its rear end pivotally engaging the sub-arch, an adjustable connection between the clevis plate and the forward end of the beam, means for adjusting the sub-arch and for securing it in adjusted position, and a lifting spring connecting the rearward end of the beam with the axle arch.

4. In a machine of the class described, a carrying frame including an arched axle having wheel carrying spindles, a sub-arch having its limbs pivotally connected to the spindles for swinging movement about the axis of the spindles, means for adjusting and securing the sub-arch, an implement carrying beam having angle plates secured on the side faces at the rearward ends thereof, said angle plates having flanges that are bent on the sub-arch, a bearing block secured between the flanges and engaging the sub-arch, and a brace adjustably connecting the forward end of the beam with the frame.

5. In a machine of the class described, a frame, an axle having an arch and also having spindles at the ends of the arch, the arch of the axle being connected to the frame, a sub-arch having its ends pivotally connected to the spindles of the axle, an adjusting lever for the sub-arch, to vary the angle between the sub-arch and the arch of the axle, said lever being fixed to one limb of the sub-arch, and means to secure said lever and hence also the sub-arch in adjusted position, and including an element attached to one limb of the axle arch.

In testimony whereof we affix our signatures.

JOHN NORTHCUTT.
MINER CRAWFORD.